United States Patent [19]
Young

[11] 3,797,597
[45] Mar. 19, 1974

[54] FOLDING MOTORIZED VEHICLE

[75] Inventor: S. Albert Young, Birmingham, Mich.

[73] Assignees: Harold J. Rineman, Southfield; Richard L. Rineman, Brighton, both of, Mich. ; part interest to each

[22] Filed: Dec. 1, 1972

[21] Appl. No.: 311,331

[52] U.S. Cl.............. 180/1 F, 280/36 R, 280/87 R, 180/25 A
[51] Int. Cl.............................................. B62d 3/14
[58] Field of Search......... 180/1 F, 25 A; 280/87 R, 280/87 B, 36 R, 34 R, 93, 96

[56] References Cited
UNITED STATES PATENTS
| | | | |
|---|---|---|---|
| 2,483,619 | 10/1949 | Brown et al. | 180/1 F X |
| 2,757,014 | 7/1956 | Schmitz | 280/87 R |

FOREIGN PATENTS OR APPLICATIONS
| | | | |
|---|---|---|---|
| 243,433 | 2/1960 | Australia | 180/1 F |
| 1,259,802 | 3/1961 | France | 180/1 F |

Primary Examiner—Kenneth H. Betts
Attorney, Agent, or Firm—Benjamin W. Colman

[57] ABSTRACT

A portable motorized or powered vehicle which is compactly folded for translation in a trunk or storage chamber of a conventional motor vehicle. Compactness of the powered vehicle is achieved by pivoting the front wheel supporting legs simultaneously rearwardly, and swinging the front wheel legs on each side inwardly toward the vehicle frame for securement thereto, so that the wheels assume a tucked-in posture closely adjacent the frame and just forwardly of the rear wheels, the vehicle frame being compactly arranged about the power engine which is positioned substantially medially of the framing structure.

21 Claims, 13 Drawing Figures

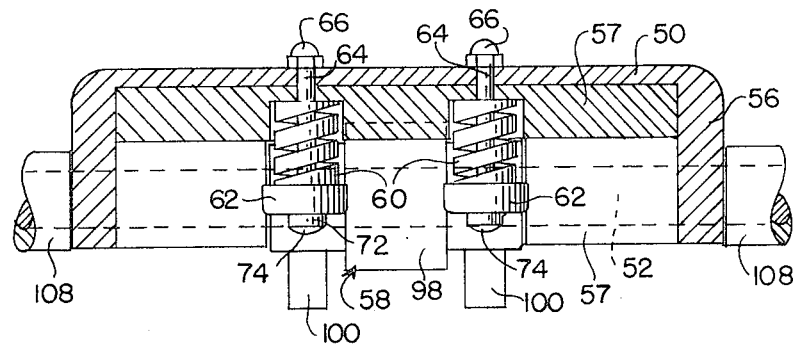
FIG. 8
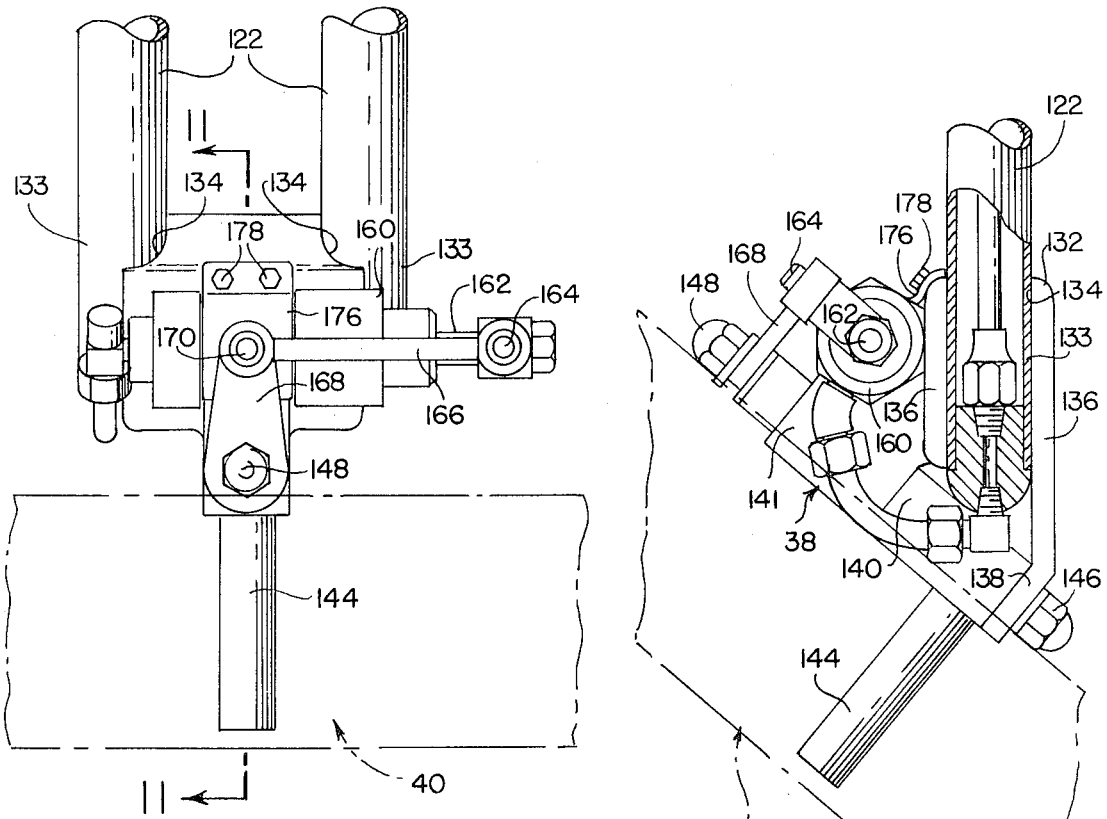
FIG. 9
FIG. 10

3,797,597

FOLDING MOTORIZED VEHICLE

The folding vehicle device of this invention generally comprises and involves a framing structure supporting a powered engine of the internal combustion type substantially medially thereof, a pair of front wheels and supporting legs arranged for steering the vehicle and pivotally attached for swinging movement upon the framing structure, a pair of rear wheels axle-mounted upon the rearward end of the framing structure, and a seat support for the vehicle operator. An accessory carrier can be added to the steering column of the vehicle.

Compactness is achieved by a support structure for the front wheels which permits simultaneous pivoting movement of the front wheel supporting legs in substantially vertical paths to bring the front wheels rearwardly and adjacent the rear wheels by means of compact pivoting joints secured to a transversely arranged cross shaft therebetween. These joints embody means for swinging the front wheels inwardly toward and closely adjacent the framing structure and the rear wheels. When the front wheels and legs have been so arranged, and these legs engaged to the frame, the vehicle is compacted into perimetric dimensions which permit the device to be transported within the truck or storage chamber of many conventional motor vehicles.

Means are provided for operator actuation of the power motor or engine, for throttle and brake control to move and stop the vehicle, and for a steering mechanism operating in conjunction with the front wheel compacting mechanism.

It is an object of the invention to provide means for compact folding of front end portions of a powered golf cart type vehicle device. Another object is the provision of means for simultaneously pivoting the front wheels and their supporting legs at each side of the vehicle in substantially vertical paths rearwardly from their normal front steering posture to a position relatively adjacent the rear wheels. A further object is the provision in the compacting structure for lateral swinging of the front wheel supporting legs inwardly toward each other so as to position the front wheels in a tucked-in posture relative to the vehicle framing structure. Yet another object is to provide means to retain the legs and front wheels in such tucked-in posture. Still another object is the provision of a compacting structure which reduces the over-all perimetric dimensions of a vehicle device to allow for its translation and transportation in a trunk or storage chamber of many conventional motor vehicles. Yet another object is the provision of means for compacting a motorized vehicle device for more facile translation, wherein each of the front wheels and its supporting leg are pivotally arranged for movement in at least two paths substantially normal to each other.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a front perspective view of a powered motorized folding vehicle device embodying the invention, the front wheels and supporting legs being arranged in their normal forward posture for ground plane steering of the device. An accessory carrier for a golf bag is shown in broken lines.

FIG. 8 is a transverse vertical sectional view through the steering mechanism housing taken substantially on the line 8—8 of FIG. 6.

FIG. 9 is a top plan view of one of the front wheels and its supporting structure, taken substantially on the line 9—9 of FIG. 2.

FIG. 10 is a bottom plan view, partially in section, of the front wheel supporting structure taken substantially on the line 10—10 of FIG. 3.

Figure 1:
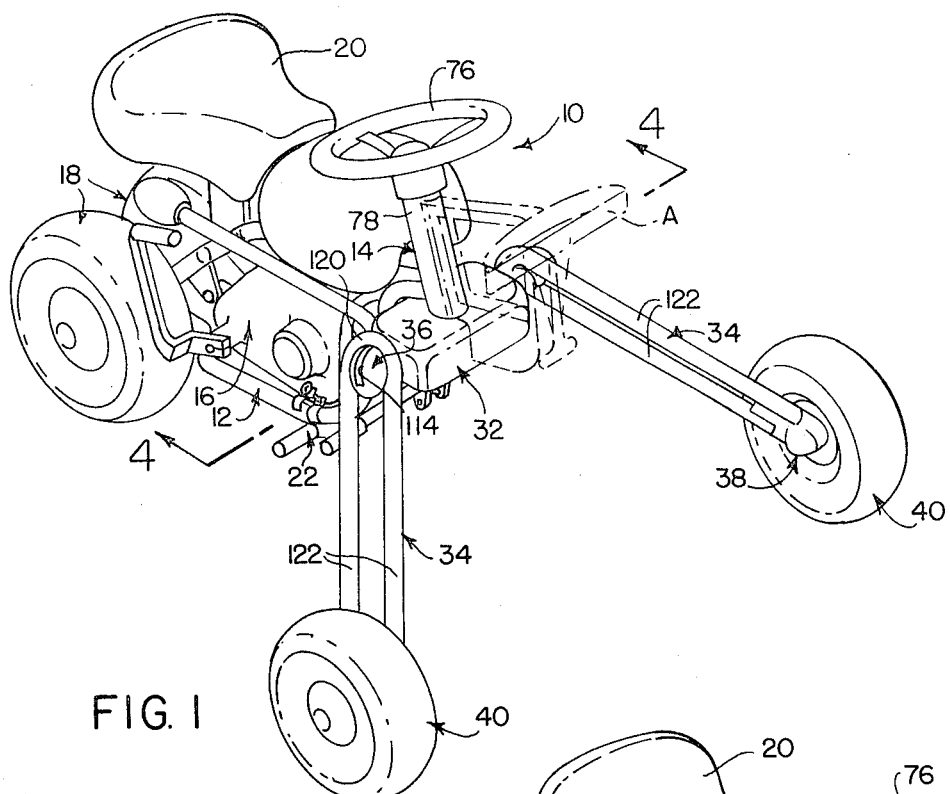

As particularly illustrated in the several views of the drawings, the folding motorized vehicle device 10 (sometimes hereinafter termed a "golf cart" or "golf cart device") comprises generally the framing structure 12, the front wheel steering system 14, an engine 16 which may be of the conventional internal combustion type mounted medially upon the framing structure 12, a pair of axle-mounted rear drive wheels 18, 18, an operator's seat 20 mounted upon the framing structure 12, and throttle and brake control mechanism 22 frame-mounted and connected to the engine 16 and the rear wheels 18, 18 respectively for actuating and braking the vehicle device 10.

In this application, the invention herein disclosed and to which the claims are directed relates particularly to the front wheels and their supporting legs and the compacting structure associated with the front wheel steering mechanism 14, which is more particularly disclosed in copending Young et al, Application Ser. No. 318,547, filed Dec. 28, 1972 for "Steering Mechanism."

The compacting structure and the steering mechanism associated therewith comprises the steering mechanism housing 32, the front wheel legs 34, 34 conjoined and secured to the knuckle joints 36, 36 at their upper ends adjacent the housing 32, the front wheel spindle and pivot assemblies 38, 38 at the lower distal ends of the legs 34 and the front wheels 40, 40 rotatably mounted and pivotable upon the assemblies 38, 38.

As more particularly illustrated in FIGS. 4–6 and 8, the steering housing body 50 supports the cross shaft 52 rotatably mounted in bearings 54, 54 in each side wall 56, 56 of the housing 32 and in the steering member 57, the load cushioning detent member 58 secured substantially medially of and to the shaft 52, the load and shock absorbing compression springs 60, 60, one end of which is seated in the retainer cup 62 secured in adjusted position to the housing body 50 by the threaded pin 64 and capping nut 66, the upper end of the spring 60 being seated in the counterbored recess 68 of the steering member 57. The lower end of the pin 64 is fixedly secured to the base of the retainer cup 62. The spring cup 62 is further provided with a hub section 72 terminating in a convexly curved crown distal end 74.

The steering mechanism comprises in part the manually operable steering wheel 76, tubular steering column 78 affixed to and supported by the framing members 79 and 81 forming a part of the framing structure 12, steering post 80, bearing 82 and sleeve bushing 84, spur gear 86 affixed to the post 80, and rack 88 associated therewith, the two latter components being seated in the upper longitudinally extending recess 90 of the member 57. The steering system and related components thereof are more particularly described and disclosed in aforesaid copending Young et al, application Ser. No. 318,547.

The detent member 58, rotatable upon and with cross shaft 52, comprises a body 98 having a pair of detent segments 100, 100 aligned with the spring cup crown end portions 74, 74, the detent body 98 being fixedly mounted upon the shaft 52 by a set screw 102 threadedly engaged in the body 98 and entering the complementary recess opening 104 in shaft 52.

Figure 2:
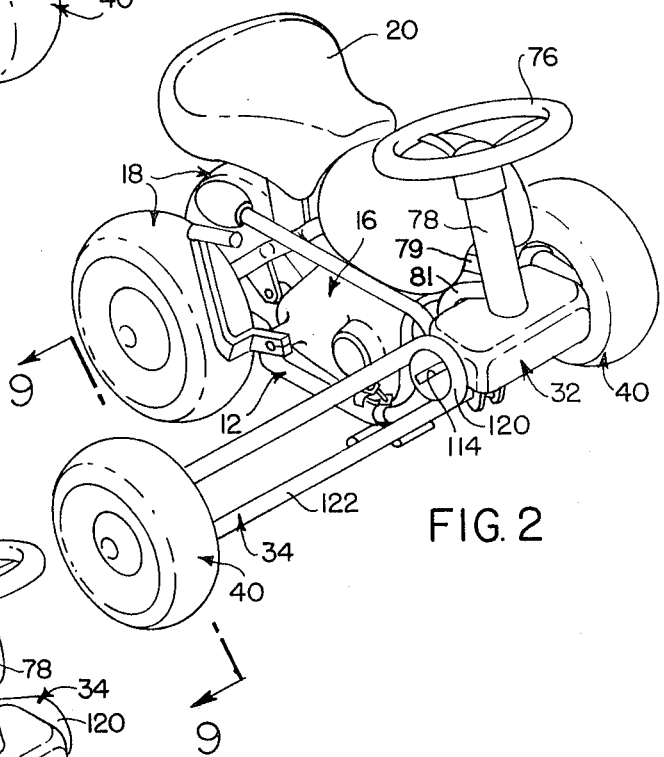
FIG. 2 is a front perspective view of the vehicle device illustrated in FIG. 1, showing the front wheels and their supporting legs pivotally rotated to a retracted rearward position.
Figure 3:
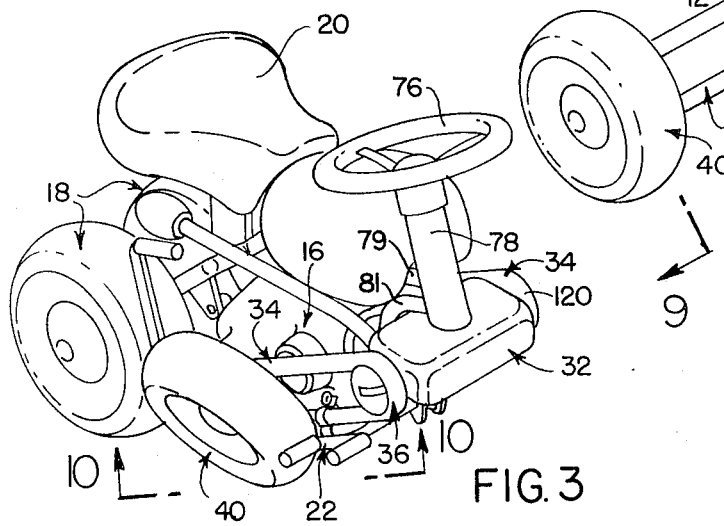
FIG. 3 is a front perspective view of the vehicle device illustrated in FIGS. 1 and 2, showing the front wheels and supporting legs tucked in toward and closely adjacent the framing structure of the device.

The cross shaft 52 is secured at its ends to the knuckle joints 36 at their hub sections 108 by pins 110 passed through complementary openings in the hub section and the shaft in register with each other. The knuckle joints 36 each comprises a body 112 from which the hub section 108 extends, the body having a radial slot 114 cut through a portion of its spherical periphery substantially in the plane of the hub section 108, the key 116 being secured for rotation in the slot 114 by a cross pivot pin 118 passed through openings 119 in the key 116, 119a in the body 112, and 119b in the tubular leg members 122, 122 at the curved knuckle end web portion 120 of the wheel supporting legs 34, 34, the ends of pin 118 being threaded and securing nuts 124, 124 thereto. The legs 34, 34 rotate about the axis of pivot pin 118 in a transverse path toward and away from the framing structure 12, and the knuckle joints 36, 36 and legs 34, 34 rotate with cross shaft 52 in a substantially vertical path generally longitudinally of the vehicle, i.e., forwardly and rearwardly of the steering housing 32. The leg members 122, 122 and the knuckle joint body 112 to which they are secured are pivotable on the cross pin 118 so that the web portion 120 of the legs swings toward or away from the housing body 50 while the wheels 40, 40 move away from or toward the framing 12, particularly as illustrated in FIGS. 2 and 3. The leg members 122, 122 are preferably formed of a single length of tubing material in a substantially hairpin configuration, the curved web portion 120 being disposed in a substantially annular groove 126 encircling a substantial portion of the knuckle joint body 112 transversely thereof.

Figure 4:
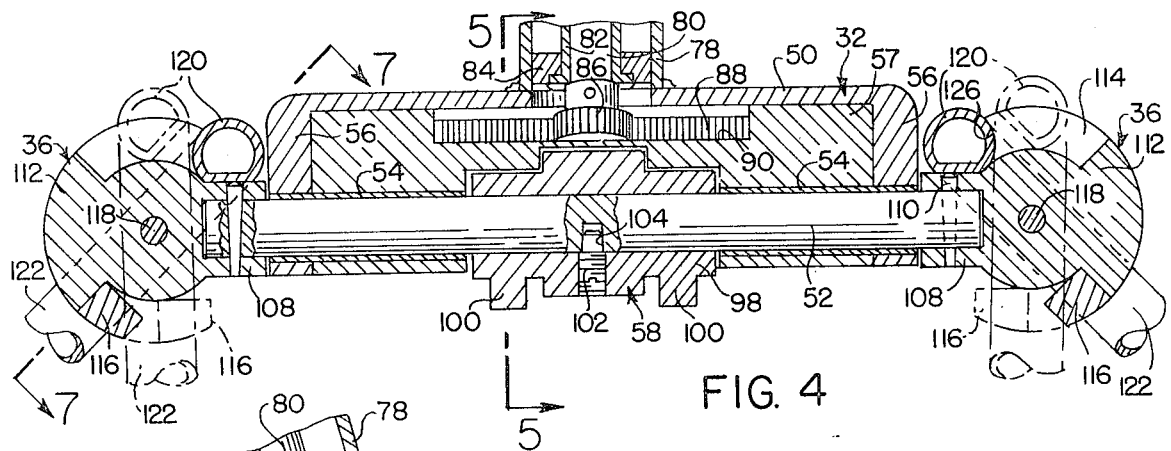
FIG. 4 is a vertical transverse sectional view taken through the steering housing at the cross shaft and conjoined knuckle joints of the front wheel supporting legs, substantially on the line 4—4 of FIG. 1.
Figure 5:
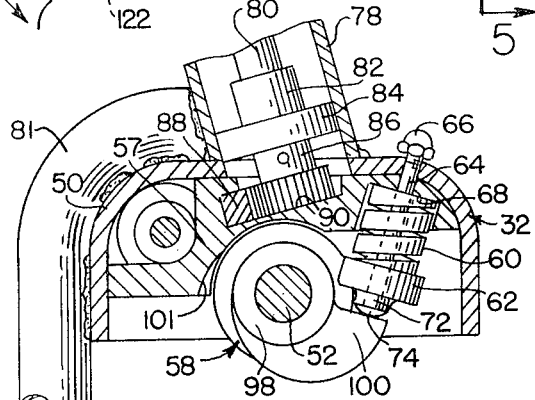
FIG. 5 is a vertical sectional view taken substantially on the line 5—5 of FIG. 4.
Figure 6:
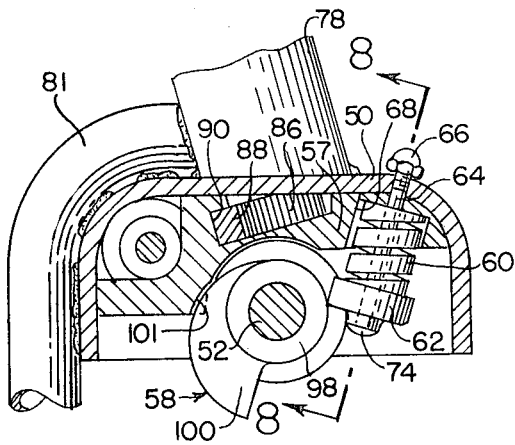
FIG. 6 is a view substantially the same as that illustrated in FIG. 5, but showing one of the transverse cross shaft mounted cams rotated clockwise to a posture represented by the retracted rearward position of the front wheels and their supporting legs as shown in FIG. 2.
Figure 7:
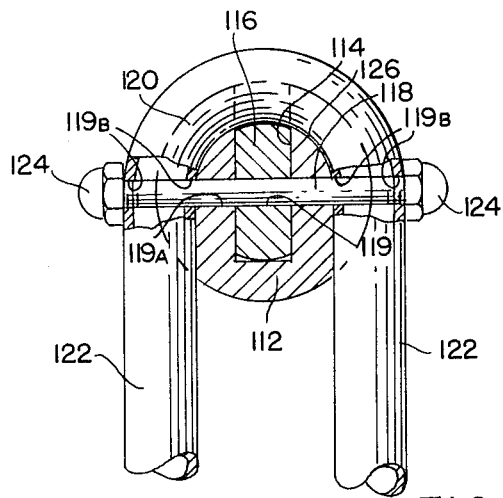
FIG. 7 is an elevational view partially in section, taken substantially on the line 7—7 of FIG. 4.
Figure 11:
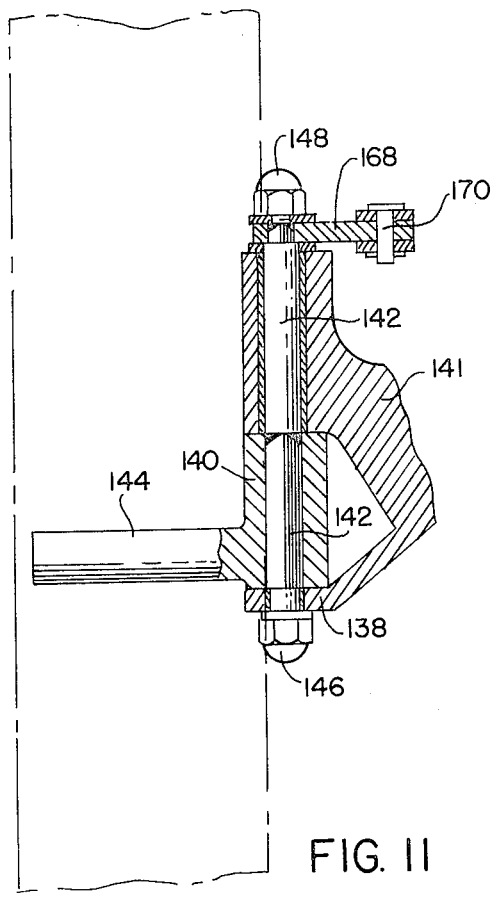
FIG. 11 is a vertical sectional view taken substantially on the line 11—11 of FIG. 9.

As illustrated in FIG. 4, the detent member 58 is so affixed to the cross shaft 52 by the set screw 102, or other suitable keying means, that the detent elements 100, 100 bear upon the spring end retainer cups 62 at their crown ends 74, to compress the springs 60, 60 when the front wheels 40, 40 are rotated forwardly into their normal steering positions. The legs 34, 34, at each side of the housing 32, are then disposed forward of the cross shaft 52 so that a load is applied to the springs 60, 60 by the detent elements 100, 100. In this posture, the springs 60, 60 function as shock absorbers for the front wheels 40, 40 and the structural elements including the legs 34, 34 which support these front wheels. When the legs 34, 34 and cross shaft 52 are rotated so as to posture the front wheels 40, 40 to the rear, as in FIG. 2, the detent elements 100, 100 rotate clockwise to a stop position (FIG. 6), represented by the proximal portions of the detent elements 100 bearing against the recess surfaces 101 of the steering member 57. Of course, other suitable stop or limiting means can be used to limit such retractive movement.

The lower or distal extremities of the leg members 122, 122 are secured to the front wheel spindle and pivot assemblies 38, each comprising a leg member receiving portion 132 securing the distal ends 133, 133 of the leg members in grooves or slots 134, 134 at each side of an intermediate web portion 136 by welding them to the portion 132, or by fasteners or other suitable securing means. The leg receiving portion 132 terminates at its lower end in the flange portion 138 upon which the wheel hub 140 is pivotally mounted. Above the wheel hub, a spindle or bearing 141 for the kingpin 142 is fixedly secured to the web portion 136. The wheel axle 144 is affixed to the hub 140 and extending laterally therefrom, the hub 140 being fixedly secured to the kingpin 142.

The kingpin 142 which extends through the spindle 141, the hub section 140 and the supporting flange 138 is rotatably secured thereto at its lower end by the nut 146, threadedly mounted upon the kingpin, and by the fitting 148 at its upper end. The hub mounted axle 144 rotates about the axis of the kingpin 142 in a path or plane substantially normal to the axis of the kingpin, for steering purposes. For compaction, the wheels 40, 40 when tucked in are preferably arranged substantially in parallel with the framing 12, in order to achieve the desired minimal perimetric transverse dimension.

The steering mechanism associated with and conjoined to the kingpin 142 at the assembly 130 (FIG. 9) comprises the hydraulic fluid cylinder housing 160 suitably secured in fixed position to the spindle portion 141, and provided with a cylinder and an internal hydraulically actuated piston having a connected piston rod 162 issuing from the housing. A first pivot pin 164 is secured to and above the distal end of the piston rod 162. A first link 166 is pivotally connected to the pin 164 at one end and to the second link 168 by the pin 170 at its other end. The second link 168 is fixedly secured at its distal end to the upper end of the kingpin 142 by the member 148. Thus, when the piston in housing 160 is hydraulically actuated and moves to the right or left of center (FIG. 9), the piston rod 162 shifts the link 166 in the same direction, rotating the second link 168 clockwise or counterclockwise respectively, and therefore the kingpin 142 similarly about its axis, causing the wheel axle 144 and wheel 40 rotatably mounted thereon to pivot in a similar direction for steering purposes. To secure the cylinder housing 160 in fixed position, a retaining clip 176 is disposed about the central portion of the housing and secured to the body of spindle 141 by screws 178 or other suitable fastening means.

To fold the front wheel legs 34, 34 and tuck the wheels 40, 40 inwardly closely adjacent the framing structure 12, as illustrated in FIGS. 2 and 3, one of the legs 34, 34 connected to the transverse cross shaft 52 through the knuckle joint 36 is manually grasped, on the one side or the other of the steering housing 32, and rotated rearwardly in a substantially vertical path to a posture substantially as illustrated in FIG. 2. This causes the detent member portions 100 to rotate to the posture illustrated in FIG. 6, away from the compression shock-absorbing spring retainer cups 62 and up against the stop recesses 101. Grasping either pair of leg members 122, 122 causes the opposite pair of leg members and supported wheel to rotate simultaneously so that only one set of leg members need be grasped. Once the legs 34, 34 have been rotated rearwardly to their retracted positions, the leg members 122, 122 at each side are swung in toward the framing structure 12 separately to tuck the wheels thereunder, their inward movement being limited by the free distance available to the key 116 for its rotative travel in the knuckle joint body slot 114. That free distance in slot 114 also determines the angular posture of the legs 34, 34 in their forwardly extended positions for steering the vehicle device 10. When each leg 34 has been pivoted inwardly toward the framing structure 12, a retainer 180 attached to the framing member 182 is manually engaged with one of the leg members 122 to retain the leg in a compacted posture closely adjacent the framing structure 12.

The retainer 180 comprises the pin 184, the coupling 186 having a web section 188 encircling the framing member 182 and terminating in flanges 190, 190 having openings 192, 192 therethrough for the pin 184, a spring 194 disposed between the proximal flange 196 and the slidable cup flange 198, the pin 184 being peened at its proximal end 200 to retain the flange 196 thereon, a shoulder 202 securing the retainer leg-engaging clip 204 extending from the web section 206 secured by the finger loop 208 to the shoulder 202 by a threaded screw extending from the loop hub end 210 or by any other suitable means. The coupling 186 can be affixed to the framing member 182 or be slidable thereon.

Figure 12:
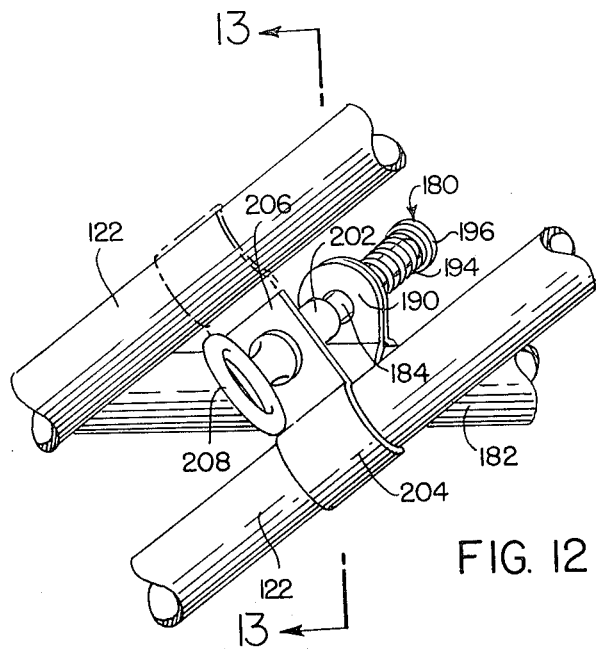
FIG. 12 is an elevational view partially in section, showing a retainer securing the front wheel legs to the framing structure.
Figure 13:
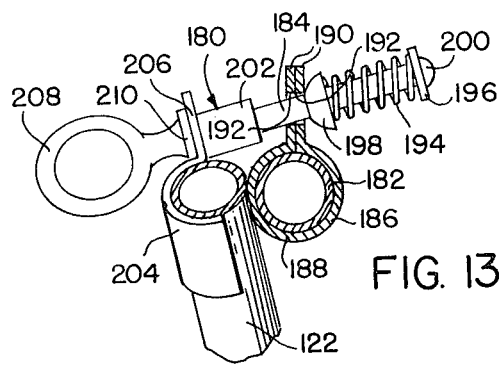
FIG. 13 is a vertical sectional view partially in elevation, taken substantially on the line 13—13 of FIG. 12.

When each leg 34 is brought adjacent the framing member 182, the finger loop 206 is manually grasped and pin 184 pulled outwardly against the bias of spring 194 to engage the retaining clip 204 upon one of the leg members 122. Although the retainer 180 is illustrated and described as having a single retainer clip 204, it will be understood that a pair of such retaining clips can be disposed at each end of the web section 206 to engage both of the leg members 122, 122, as indicated in broken line in FIG. 12.

Although not illustrated in the drawings nor described above, the vehicle 10 can also be provided with a manually graspable handle secured to the framing structure in any convenient position for more facile lifting of the compacted vehicle into and out of the trunk or storage chamber of the transporting automobile. Such lifting means is conventional and can be arranged in one or several places to suit the convenience of the owner and/or operator of the vehicle.

Although the vehicle 10 has been designed primarily for use as a golf cart, to carry a player on the seat 20 and his golf bag in any suitable accessory carrier A such as is shown in broken line in FIG. 1, the accessory carrier could as well be a wire basket or any other suitable and desirable carrier device for transporting articles.

Although particular embodiments of the invention have been disclosed herein for purposes of explanation, further modifications and variations thereof, after study of this specification, will or may become apparent to those skilled in the art to which the invention pertains. Reference should be had to the appended claims in determining the scope of the invention.

I claim:

1. In a folding vehicle adapted to be compacted from its normally operative extended posture to reduced perimetric dimensions for more facile translation, the improved combination comprising
 a framing structure supporting a steering mechanism and housing secured thereto,
 and means secured to said housing for compacting said vehicle to reduced perimetric dimensions comprising
 a cross shaft rotatably mounted upon said housing, a pair of wheel supporting legs,
 means secured to the ends of said cross shaft and to said legs for pivoting said legs in substantially vertical paths forwardly and rearwardly of said housing and for pivoting said legs inwardly toward and outwardly away from said framing structure,
 and a pair of vehicle supporting front wheels rotatably mounted upon said legs at their distal ends for steering said vehicle in response to operation of said steering mechanism.

2. The structure defined in claim 1, wherein
said housing comprises a body having laterally depending walls,
 a pair of aligned openings in said walls,
said cross shafts being rotatably supported by said walls and extending through said openings and outwardly of said walls at each end thereof.

3. The structure defined in claim 2, wherein
said means for pivoting said legs comprises
 a knuckle joint fixedly secured to each end of said cross shaft and having
 a body,
 a slot in said body,
 a key rotatable in said body slot and pivotable about an axis transversely the axis of said cross shaft,
 a pivot pin for said key secured to said body and to said legs.

4. The structure defined in claim 3, wherein
each said knuckle joint body is provided with a hub portion receiving and secured to an end of said cross shaft,
said knuckle joints being rotatable about the axis of said cross shaft.

5. The structure defined in claim 2, and wherein said means for compacting said vehicle further comprises
   shock absorbing means for said front wheels and legs secured to said housing,
   and detent means fixedly secured to said cross shaft for engagement with said shock absorbing means when said legs are pivoted into extended steering posture and out of engagement with said shock absorbing means when said legs are pivoted into compacted posture.

6. The structure defined in claim 5, wherein
said shock absorbing means comprises a pair of compression springs and cups supporting said springs at their distal ends,
said detent means adapted to rotate into bearing contact with said spring cups to limit rotative movement of said cross shaft upon pivoting movement of said legs into extended steering posture.

7. The structure defined in claim 3, wherein
each of said legs is fixedly secured to said knuckle joint body by said pivot pin.

8. The structure defined in claim 7, wherein
each of said legs comprises
   a member bent into a hairpin configuration to form a pair of leg members and an intermediate web portion, said web portion secured to said knuckle joint body in a groove thereabout,
   said leg members extending in substantially parallel attitude from said knuckle joint.

9. The structure defined in claim 7, wherein
said legs are simultaneously rotatable with and about the axis of said cross shaft in substantially vertical paths forwardly and rearwardly of said housing.

10. The structure of claim 7, wherein
said key pivot pin axis is disposed transversely of said cross shaft axis.

11. The structure defined in claim 7, wherein
said legs are separately pivotable about said key pivot pins inwardly toward and outwardly away from said framing structure.

12. The structure defined in claim 5, wherein
said housing is provided with a steering member secured thereto adjacent said detent means,
said steering member having stop means aligned with and adapted to engage said detent means and limit rotative movement of said cross shaft in pivoting movement of said legs into compacted posture.

13. The structure defined in claim 6, wherein
said compression springs are resiliently compressed by the loads and forces applied to said front wheels and legs.

14. The structure defined in claim 1, and wherein
said means for compacting said vehicle further comprises
   a spindle and pivot assembly for each said front wheels secured to said legs at their distal ends and each having
      a kingpin,
      spindle means to rotatably support said king pin,
      a hub fixedly mounted on and secured to said king pin,
      and a wheel axle fixedly secured to and extending laterally from said hub,
said front wheels being rotatably mounted upon said wheel axles and pivotable with their supporting hubs for steering said vehicle in response to the operation of said steering mechanism.

15. The structure defined in claim 14, wherein
said spindle and pivot assembly further comprises
   a body having a leg receiving and securing portion,
   said latter portion having an extension pivotally supporting said kingpin for rotation.

16. The structure defined in claim 15, wherein
said spindle means in combination with said extension pivotally support said kingpin for rotation.

17. The structure defined in claim 1, and wherein
said means for compacting said vehicle further comprises
   a retainer for and removably engageable with each of said legs to secure said legs in compacted posture.

18. The structure defined in claim 17, wherein
each said retainer is attached to said framing structure substantially in or closely adjacent the path of said leg when pivoted inwardly toward said framing structure,
said retainer being manually operable to engage with and disengage from said leg for retention thereof in a posture adjacent said framing structure.

19. The structure defined in claim 17, wherein
each said retainer is resilient, extensible and spring loaded to urge said leg retained thereby to a position adjacent said framing structure.

20. The structure defined in claim 1, wherein
said framing structure further supports an operator's seat, a power engine, and a pair of axle mounted drive wheels at its rearward end.

21. The structure defined in claim 1, wherein
said steering mechanism and housing are secured to said framing structure at its forward end.

* * * * *